(12) United States Patent
Kiesel et al.

(10) Patent No.: US 11,561,238 B2
(45) Date of Patent: Jan. 24, 2023

(54) MICROELECTROMECHANICAL INERTIAL SENSOR INCLUDING A SUBSTRATE AND AN ELECTROMECHANICAL STRUCTURE SITUATED ON THE SUBSTRATE

(71) Applicant: Robert Bosch GmbH, Stuttgart (DE)

(72) Inventors: Stefan Kiesel, Reutlingen (DE); Tobias Boeser, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 59 days.

(21) Appl. No.: 17/266,498

(22) PCT Filed: Oct. 4, 2019

(86) PCT No.: PCT/EP2019/076919
§ 371 (c)(1),
(2) Date: Feb. 5, 2021

(87) PCT Pub. No.: WO2020/078741
PCT Pub. Date: Apr. 23, 2020

(65) Prior Publication Data
US 2021/0302462 A1 Sep. 30, 2021

(30) Foreign Application Priority Data
Oct. 18, 2018 (DE) .......................... 102018217809.7

(51) Int. Cl.
*G01C 19/5776* (2012.01)
*G01P 15/125* (2006.01)
(52) U.S. Cl.
CPC ........ *G01P 15/125* (2013.01); *G01C 19/5776* (2013.01)

(58) Field of Classification Search
CPC ...... G01P 15/125; G01C 19/5776; G01D 5/24
See application file for complete search history.

(56) References Cited

U.S. PATENT DOCUMENTS

| | | | | |
|---|---|---|---|---|
| 5,535,902 A * | 7/1996 | Greiff | ................ | G01P 15/0802 216/2 |
| 5,747,353 A * | 5/1998 | Bashir | ................... | G01P 15/125 148/DIG. 135 |
| 6,070,464 A * | 6/2000 | Koury, Jr. | ............. | G01P 15/125 73/1.38 |
| 6,194,903 B1 * | 2/2001 | Schulz | .................... | G01D 5/24 324/661 |
| 6,456,477 B1 * | 9/2002 | McIntosh | .............. | G01L 9/0075 361/283.4 |
| 9,709,509 B1 * | 7/2017 | Yang | ......................... | B81B 7/02 |
| 10,386,203 B1 * | 8/2019 | Zheng | ................ | G01C 19/5776 |

(Continued)

FOREIGN PATENT DOCUMENTS

DE   102009026496 A1   12/2010

OTHER PUBLICATIONS

International Search Report for PCT/EP2019/076919, dated Jan. 20, 2020.

(Continued)

*Primary Examiner* — David J Bolduc
(74) *Attorney, Agent, or Firm* — Norton Rose Fulbright US LLP; Gerard Messina

(57) ABSTRACT

A microelectromechanical inertial sensor including a substrate and an electromechanical structure situated on the substrate.

8 Claims, 1 Drawing Sheet

(56) References Cited

U.S. PATENT DOCUMENTS

| | | | |
|---|---|---|---|
| 2009/0007661 A1* | 1/2009 | Nasiri | G01C 19/5769 73/504.03 |
| 2010/0058865 A1* | 3/2010 | Zhang | G01P 15/0802 73/514.38 |
| 2010/0242603 A1* | 9/2010 | Miller | B81B 7/02 29/830 |
| 2012/0146726 A1* | 6/2012 | Huang | G06F 3/041662 330/257 |
| 2012/0223410 A1* | 9/2012 | Fujii | H01L 23/481 257/E21.546 |
| 2012/0223726 A1* | 9/2012 | Zhang | G01P 15/125 257/417 |
| 2013/0055564 A1* | 3/2013 | Balachandran | G01P 15/0802 29/825 |
| 2013/0057301 A1* | 3/2013 | Balachandran | G01P 15/0802 324/679 |
| 2015/0145074 A1* | 5/2015 | Kolb | G01L 9/12 438/52 |
| 2016/0054354 A1* | 2/2016 | Keal | G01P 15/16 702/141 |
| 2016/0341579 A1* | 11/2016 | Kimura | G01C 19/5776 |
| 2017/0191831 A1* | 7/2017 | Karahan | G01P 15/00 |
| 2017/0199035 A1* | 7/2017 | Seeger | G01C 19/5776 |
| 2017/0299388 A9* | 10/2017 | Karahan | G01P 15/00 |
| 2018/0273374 A1* | 9/2018 | Keal | G01P 15/18 |
| 2020/0348134 A1* | 11/2020 | Katingari | G01P 15/125 |

OTHER PUBLICATIONS

Petkov Vladimir P., et al., "A Fully Differential Charge-Balanced Accelerometer for Electronic Stability Control," IEEE Journal of Solid-State Circuits, IEEE Service Center, vol. 49, No. 1, 2014, pp. 262-270.

* cited by examiner

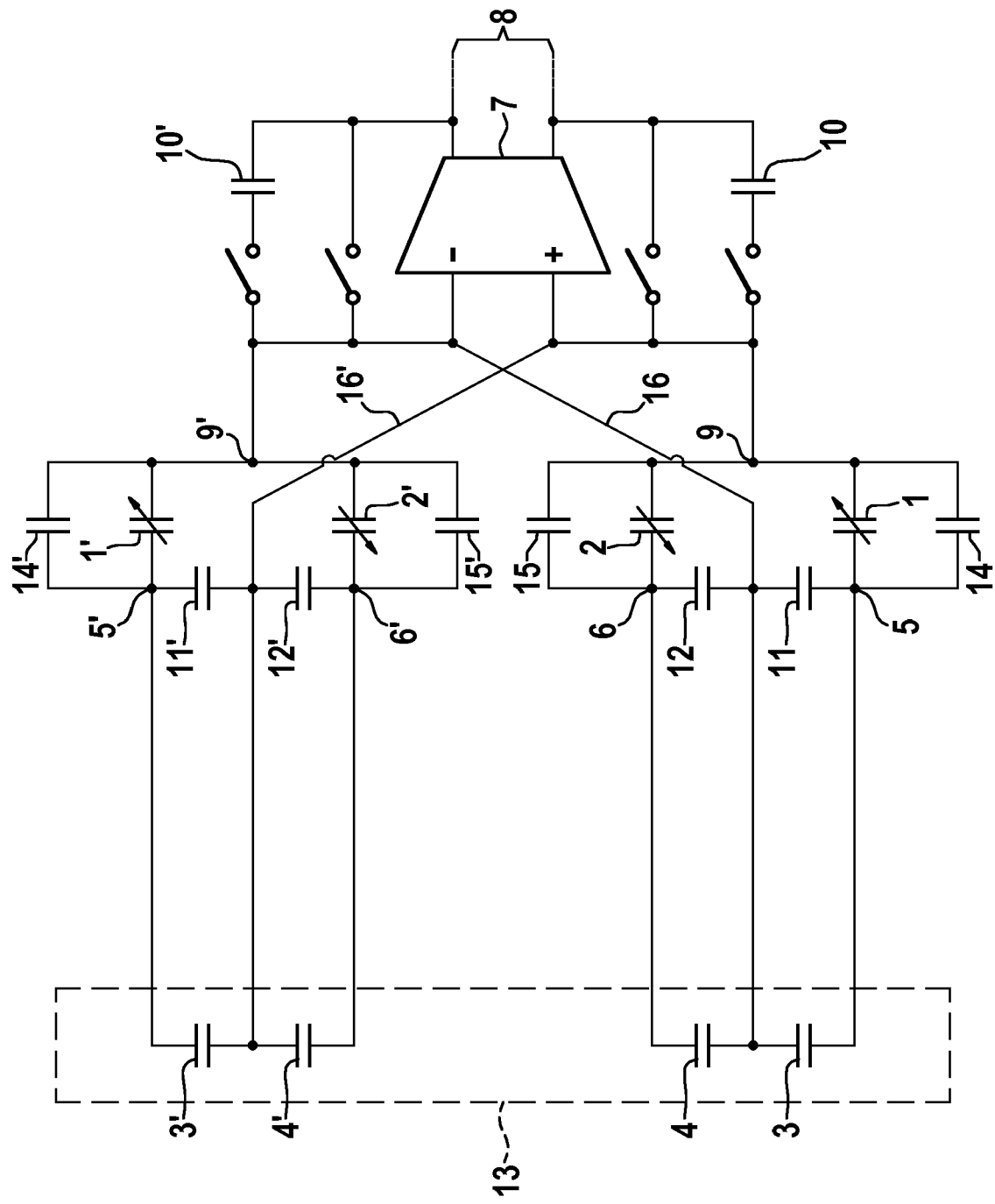

MICROELECTROMECHANICAL INERTIAL SENSOR INCLUDING A SUBSTRATE AND AN ELECTROMECHANICAL STRUCTURE SITUATED ON THE SUBSTRATE

FIELD

The present invention is directed to a microelectromechanical inertial sensor.

BACKGROUND INFORMATION

Various specific embodiments of microelectromechanical inertial sensors in the related art are conventional. The measuring principle of such sensors is based on the inertial forces which occur during a linear acceleration or rotation being detectable by the deflection of a seismic mass. To convert the deflection into an electrical signal, an electrode (mass electrode) connected to the resiliently mounted seismic mass (mass oscillator), for example, is situated between two electrodes fixed to a substrate (substrate electrodes). The deflection of the mass oscillator results in a change in distance of the first electrode pair (i.e., between the first substrate electrode and the mass electrode) and a change in distance of the second electrode pair (second substrate electrode and mass electrode), and thus in a change in the capacitances $C_1$ and $C_2$ of the two electrode pairs. For measuring these changes in capacitances, the substrate electrodes are connected to potentials $V_S$ and $-V_S$ (i.e., opposite polarities), and potential $V_0$ of the ground electrode is determined. In the case of a perfect charge equalization (i.e., without parasitic losses), the charge shifts of the two electrode pairs caused by the capacitance changes are identical, and a linear relationship exists between $V_0$ and $V_S$ which, in turn, may be expressed by the shift $\Delta x$ of the ground electrode:

$$V_0 = V_0 \frac{C_1 - C_2}{C_1 + C_2} \propto \frac{\Delta x}{g_0}$$

In the process, $g_0$ is the distance between the two substrate electrodes. In addition, in the case of a perfect charge equalization, the force which the first substrate electrode exerts on the mass electrode is identical and opposite to the force which the second substrate electrode exerts on the mass electrode. Regardless of the shift, the forces exerted by the substrate electrodes thus completely cancel one another, so that the deflection of the mass oscillator is exclusively determined by the inertial forces to be measured.

In a practical implementation of this measuring principle, however, partially considerable parasitic capacitances always exist, for example between the mass electrode and the substrate. If the electrodes are now connected to an electrical potential, an additional charge shift occurs, due to the parasitic capacitances, which disrupts the charge balance between the two electrode pairs, and thus renders the above linear relationship non-linear. In addition, the perfect equalization of the electrostatic forces which are exerted by the substrate electrodes on the mass electrode also no longer applies.

A variety of options are available in the related art for achieving a charge equalization, at least approximately, through additional measures and, in this way, achieving the desired linear relationship and the electrostatic force equilibrium. Such a technique is, for example, a feedback method for charge compensation (charge balancing, see in this regard "A Fully Differential Charge-Balanced Accelerometer for Electronic Stability Control," IEEE Journal of Solid-State Circuits, Volume 49, Issue 1, January 2014). In the process, the described electrode system is embedded into a feedback path, in which the charge losses of the electrodes act as an error signal and are negatively fed back to the voltages present at the substrate electrodes. As a result of the feedback mechanism, the voltages are adapted in such a way that a vanishing charge loss arises, and thus the desired charge equalization is enforced. The associated control loop is part of a control system of the sensor, which is usually implemented in the form of an application-specific integrated circuit (ASIC), which is connected to the separately manufactured microelectromechanical structure in a later manufacturing step.

Parasitic capacitances arise in various parts of an inertial sensor. The parasitic effects in the bond wires, for example due to bond wire drift, account for approximately 20% and are subject to the production-related variances of the packaging, while the parasitic capacitances in the feed lines of the microelectromechanical structure account for approximately 10% and are subject to relatively little variances in the manufacturing process. The parasitic capacitances which arise due to fluctuations in the manufacturing process of the microelectromechanical structure itself, in particular due to so-called edge loss variance, account for the largest portion of approximately 70%. The process fluctuations during the manufacture of the microelectromechanical structure cannot be taken into consideration in the compensation technique implemented on the ASIC so that these production fluctuations impair the linearity of the sensor characteristic curve.

SUMMARY

An object of the present invention is to provide an inertial sensor in which the production fluctuations during the manufacture of the microelectromechanical structure are directly taken into consideration in the compensation mechanism for the parasitic capacitances.

In an inertial sensor in accordance with an example embodiment of the present invention, the compensation structures for the parasitic capacitances are directly implemented as part of the microelectromechanical structure (also referred to hereafter as capacitive micromechanical accelerometer, CMA), and are thus subject to analogous production fluctuations of the geometric configuration. Geometric configuration hereafter shall be understood to mean both the shape and dimensions of the different components, and the reciprocal positioning of the components with respect to one another. Due to manufacturing fluctuations, the geometric conditions deviate from the ideal geometry of the structural design, for example due to an angle of the trenches or their walls not being exactly perpendicular. Even though, in principle, the deviations vary between different microelectromechanical structures manufactured in parallel, or between different production batches, the deviations within an individual microelectromechanical structure, or between adjacent structures on the production wafer, are at least partially consistent, for example in the form of a similar inclination angle of the trenches. The principle underlying the present invention is to configure the geometric shape of the first and second capacitive compensation structures in such a way that the compensation capacitances of the compensation structures are correlated with the parasitic capacitances, i.e., that, for example, manufacturing fluctuations which result in high parasitic capacitances at the same time cause high compensation capacitances of the compensation structures. In this way, it is advantageously possible to better adapt the compensation capacitances and the parasitic capacitances to one another in the process. If, in contrast, the compensation capacitances are implemented within the ASIC, the manufacturing process of the ASIC may only be based on nominal values, without an adaptation between compensation capacitances and parasitic capacitances being possible.

According to one preferred specific embodiment of the inertial sensor according to the present invention, the inertial sensor includes a control unit, the control unit being configured to minimize an error signal, the error signal being based on a charge balance between the first and second capacitances, the minimization of the error signal taking place by adapting an electrical potential present at the second electrode and by adapting an electrical potential present at the third electrode. In this specific embodiment, the linearity of the sensor characteristic curve is improved through the use of a method for charge equalization (charge balancing). In this way, charge losses are advantageously adjusted to zero, and thus the linearity of the sensor characteristic curve is ensured.

According to one further preferred specific embodiment of the inertial sensor according to the present invention, the control unit is implemented as an application-specific integrated circuit. In the process, the control unit including the components of the feedback system, together with the components for reading out the sensor and for the sensor signal processing, are implemented as part of an ASIC, while the mass oscillator and the first, second, and third electrodes are implemented on the CMA side.

According to one further preferred specific embodiment of the inertial sensor according to the present invention, the error signal is based on a charge balance between the first and second capacitances, and on a charge balance between the first and second compensation capacitances. In this way, the compensation structures according to the present invention are advantageously integrated into the control loop. The charge balance between the first and second capacitances and between the first and second compensation capacitances balanced by the control process advantageously generates an improvement in the linearity of the sensor characteristic curve.

The linearity of the sensor characteristic curve may furthermore be improved by adding further compensation capacitances on the ASIC side. According to one further preferred specific embodiment of the inertial sensor according to the present invention, the control unit includes a first capacitive element having a third compensation capacitance and a second capacitive element having a fourth compensation capacitance, the first capacitive element being connected in parallel to the first capacitive compensation structure, and the second capacitive element being connected in parallel to the second capacitive compensation structure, and the error signal being based on a charge balance between the first and second capacitances and on a charge balance between the first, second, third, and fourth compensation capacitances.

According to one further preferred specific embodiment of the inertial sensor according to the present invention, the control unit includes a third capacitive element and a fourth capacitive element, the third capacitive element being connected between the first and second electrodes, and the fourth capacitive element being connected between the first and third electrodes.

The above descriptions relate to the case of an inertial sensor including a mass oscillator and at least three associated electrodes. The capacitive compensation structures according to the present invention, however, may be used in general for improving the linearity of the sensor characteristic curve in sensors including more than one mass oscillator. The above-described features directly generalize.

According to one further preferred specific embodiment of the inertial sensor according to the present invention, the electromechanical structure includes a second mass oscillator, a fourth electrode connected to the mass oscillator, and a fifth and sixth electrode connected to the substrate, a third capacitance being present between the fourth and fifth electrodes, and a fourth capacitance being present between the fourth and sixth electrodes, the electromechanical structure including a third capacitive compensation structure which is connected to the fifth electrode and has a fifth compensation capacitance, and a fourth capacitive compensation structure which is connected to the sixth electrode and has a sixth compensation capacitance, the third and fourth compensation capacitances being provided for the compensation of the parasitic capacitance.

According to one further preferred specific embodiment of the inertial sensor according to the present invention, the error signal is based on a charge balance between the first and second capacitances, and on a charge balance between the third and fourth capacitances, the minimization of the error signal taking place by adapting an electrical potential present at the second electrode, an electrical potential present at the third electrode, an electrical potential present at the fifth electrode, and an electrical potential present at the sixth electrode. In this way, the capacitive compensation structures may advantageously be integrated into a control loop including the electrodes of both mass oscillators. One exemplary embodiment of such a system is shown in FIG. 1. Compensation structures and control systems for sensors including more than two mass oscillators may be formed in an analogous manner. The above-described features directly generalize.

BRIEF DESCRIPTION OF THE DRAWING

FIG. 1 schematically shows the circuit of a capacitance-to-voltage transformer for an inertial sensor including two mass oscillators according to one specific example embodiment of the present invention.

DETAILED DESCRIPTION OF EXAMPLE EMBODIMENTS

FIG. 1 shows the schematic circuit diagram of a possible implementation of a capacitance-to-voltage transformer for an inertial sensor including capacitive compensation structures. In this specific embodiment, the sensor core includes two mass oscillators, each mass oscillator including a mass electrode (first electrode), which is situated between two substrate electrodes (second and third electrodes). The two mass oscillators and the associated electrodes are identical in terms of the design, however electrical potentials having opposite polarities are applied thereto. Depending on the deflection of the first mass oscillator and the mass electrode connected thereto, a first capacitance 1 is present between the first substrate electrode and the mass electrode, and a second capacitance 2 is present between the second substrate electrode and the mass electrode.

In the case of a perfect charge equalization between the two electrode pairs, the output voltage is linearly dependent on the displacement of the mass oscillator. However, parasitic capacitances cause a non-equalized charge balance between the two electrode pairs, resulting in a non-linear relationship, and the electrostatic forces between the substrate electrodes and the mass electrode not exactly canceling one another out. An analogous situation arises for the second mass oscillator, in which the capacitances between the mass electrode (fourth electrode) and the associated substrate electrodes (fifth and sixth electrodes) are denoted by 1' and 2'.

To minimize the charge losses at capacitances 1, 2 and 1', 2' caused by the parasitic capacitances, the capacitive dividers 1, 2 and 1', 2' are embedded into a feedback path, the charge losses acting as an error signal. For this purpose, the electrical signals at nodes 9 and 9' are connected crosswise via connections 16 and 16' to amplifier 7 and converted by the integrator formed by amplifier 7 and capacitors 10 and 10' into an output voltage 8, with the aid of which the respective potentials present at nodes 5 and 6, or 5' and 6', are adapted. As a result of the negative feedback, the charge losses are thus adjusted to zero (charge balancing). The details of the circuit and of the feedback method are described in "A Fully Differential Charge-Balanced Accelerometer for Electronic Stability Control," IEEE Journal of Solid-State Circuits, Volume 49, Issue 1, January 2014.

The control loop for the charge equalization is implemented as part of an application-specific integrated circuit (ASIC), which is connected to the CMA, i.e., the microelectromechanical structure of the sensor core, in particular, to the mass oscillator and the associated electrodes. The shown mechanism for the charge equalization furthermore includes a series of additional compensation capacitances, which are partially implemented as a component of the ASIC and partially as a component of the CMA. In the process, compensation capacitances 11, 12, 14 and 15, or 11', 12', 14' and 15', are part of the ASIC and are connected in series with one another between nodes 5 and 6, or 5' and 6', connected to the substrate electrodes. A first capacitive compensation structure 3 is connected in parallel to the first capacitive element 11, and a second capacitive compensation structure 4 is connected in parallel to the second capacitive element 12, compensation structures 3 and 4 being implemented as part of the CMA. Analogously, two further compensation structures 3' and 4' are connected in parallel to compensation capacitances 11' and 12' associated with the second mass oscillator. In the process, all compensation structures 3, 4, 3', 4' are completely implemented on the CMA side. The compensation of the parasitic capacitances of the microelectromechanical structure results from an interplay of the control loop and compensation capacitances 11, 12, 14, 15, 11', 12', 14', 15' on the ASIC side, and the proportionate implementation of the CMA-side structure 13, made up of compensation structures 3, 4, 3' and 4'. According to the present invention, the geometric configuration of compensation structures 3, 4, 3' and 4' is selected in such a way that the production fluctuations which occur during the manufacture of the CMA influence the parasitic capacitances of the microelectromechanical structure and the compensation capacitances of the compensation structures in an analogous manner. In this way, it may advantageously be ensured that the compensation structures, due to their geometric configuration, are already matched to the parasitic capacitances to be compensated.

What is claimed is:

1. A microelectromechanical inertial sensor, comprising:
a substrate;
an electromechanical structure situated on the substrate, the electromechanical structure including a sensor core, the sensor core including at least one mass oscillator mounted oscillatorily with respect to the substrate, a first electrode, a second electrode, and at least one third electrode, the first electrode being connected to the mass oscillator, and the second and third electrodes being connected to the substrate, a first capacitance being present between the first and second electrodes, and a second capacitance being present between the first and third electrodes, the electromechanical structure having a parasitic capacitance, the parasitic capacitance being determined by manufacturing deviations in a geometric configuration of the sensor core, the electromechanical structure further including a first capacitive compensation structure connected to the second electrode and a second capacitive compensation structure connected to the third electrode, a first compensation capacitance of the first capacitive compensation structure being determined by a geometric configuration of the first capacitive compensation structure which has manufacturing deviations analogous to the geometric configuration of the sensor core, a second compensation capacitance of the second capacitive compensation structure being determined by a geometric configuration of the second capacitive compensation structure which has manufacturing deviations analogous to the geometric configuration of the sensor core, the first and second compensation capacitances compensating for the parasitic capacitance.

2. The microelectromechanical inertial sensor as recited in claim 1, wherein the inertial sensor includes a control unit, the control unit being configured to minimize an error signal, the error signal being based on a charge balance between the first and second capacitances, the minimization of the error signal taking place by adapting an electrical potential present at the second electrode and by adapting an electrical potential present at the third electrode.

3. The microelectromechanical inertial sensor as recited in claim 1, wherein the control unit is implemented as an application-specific integrated circuit.

4. The microelectromechanical inertial sensor as recited in claim 2, wherein the error signal is based on a charge balance between the first and second capacitances, and on a charge balance between the first and second compensation capacitances.

5. The microelectromechanical inertial sensor as recited in claim 2, wherein the control unit includes a first capacitive element having a third compensation capacitance and a second capacitive element having a fourth compensation capacitance, the first capacitive element being connected in parallel to the first capacitive compensation structure, and the second capacitive element being connected in parallel to the second capacitive compensation structure, and the error signal being based on a charge balance between the first and second capacitances and on a charge balance between the first, second, third and fourth compensation capacitances.

6. The microelectromechanical inertial sensor as recited in claim 1, wherein the control unit includes a third capacitive element and a fourth capacitive element, the third capacitive element being connected between the first and second electrodes, and the fourth capacitive element being connected between the first and third electrodes.

7. The microelectromechanical inertial sensor as recited in claim 2, wherein the electromechanical structure includes a second mass oscillator, a fourth electrode connected to the second mass oscillator, and a fifth and sixth electrode connected to the substrate, a third capacitance being present between the fourth and fifth electrodes, and a fourth capacitance being present between the fourth and sixth electrode, the electromechanical structure including a third capacitive compensation structure which is connected to the fifth electrode and has a fifth compensation capacitance, and a fourth capacitive compensation structure which is connected to the sixth electrode and has a sixth compensation capacitance, the third and fourth compensation capacitances compensating for the parasitic capacitance.

8. The microelectromechanical inertial sensor as recited in claim 7, wherein the error signal is based on a charge balance between the first and second capacitances, and on a charge balance between the third and fourth capacitances, the minimization of the error signal taking place by adapting an electrical potential present at the second electrode, an electrical potential present at the third electrode, an electrical potential present at the fifth electrode, and an electrical potential present at the sixth electrode.

* * * * *